(12) United States Patent
Pettit

(10) Patent No.: US 6,308,937 B1
(45) Date of Patent: Oct. 30, 2001

(54) RAILING SYSTEM (75) Inventor: Frederick M. Pettit, Ridgeway (CA)

(73) Assignee: GSW Inc., Toronto (CA)

( * ) Notice: Subject to any disclaimer, the term of this patent is extended or adjusted under 35 U.S.C. 154(b) by 0 days.

(21) Appl. No.: 09/450,444

(22) Filed: Nov. 30, 1999

(51) Int. Cl.$^7$ .................................................. E04H 17/14
(52) U.S. Cl. .............................. 256/65; 256/66; 403/187; 403/192
(58) Field of Search .................................. 256/65, 66, 67, 256/68, 70, 72, 19; 403/187, 188, 191, 192, 195, 199

(56) References Cited

U.S. PATENT DOCUMENTS

| | | | |
|---|---|---|---|
| 3,520,561 | * | 7/1970 | Rininger ................................. 285/24 |
| 4,386,870 | * | 6/1983 | Baroody ............................... 403/234 |
| 4,541,600 | * | 9/1985 | Vieglins ............................... 248/235 |
| 4,648,517 | * | 3/1987 | Schafer ............................... 211/183 |
| 4,697,949 | * | 10/1987 | Perez ................................... 403/361 |
| 4,737,047 | * | 4/1988 | Oshita ................................. 403/191 |
| 4,786,203 | * | 11/1988 | Conner et al. ...................... 403/190 |
| 5,931,598 | * | 8/1999 | Wang .................................. 403/351 |

* cited by examiner

Primary Examiner—Lynne H. Browne
Assistant Examiner—Doug Hutton (57) ABSTRACT A railing system suitable for decks, stairs, porches and other structures uses a collar connector applied over the open end of a tabular rail for securing the rail to a support surface. The connector has an exterior collar into which the open end of a railing is inserted. The railing is also engaged on the interior of the railing by an inserted plug. The railing is trapped between the inserted plug and the collar whereby a tight connection is achieved. The gap between the inserted plug and the exterior collar narrows from the open end of the collar towards the base.

14 Claims, 7 Drawing Sheets

RAILING SYSTEM

FIELD OF THE INVENTION

The present invention relates to railing systems, and in particular, relates to a connection system for connecting railings to upright posts.

There are a number of railing systems which attempt to provide a simple railing for use in association with decks and porches, and angled railings for stairs. Many systems use ports provided in plastic extruded vertical posts, which ports are sized to receive the end of an extruded railing. These ports are typically provided in the upright posts at the time of manufacture and many different posts are required for different configurations. In other systems the user roughly cuts a port in the post and an insert is located in the rough opening for finishing the surface about the port. Systems of this type reduce the number of specialized posts required, however, the difficulty in installing the system increases as the user must determine the position of ports and cut the ports.

It is also known to have fittings with exterior collars which are applied over the ends of the rails. These fittings are mechanically secured to the outside of the post. Other proposed systems use a plug type insert which is mechanically connected to the outside post and the rail slides over and locks with the plug member. The various types of connectors typically require some sort of mechanical screw type fastening of the components which can reduce the visual appearance of a product with plug type connecting systems. It is critical to cut the rails precisely to achieve the desired visual appearance and as such, the installation is more difficult. Rails cut off at an incorrect angle or cut too short, seriously detract from the appearance of the installed product.

With these types of systems, the rails and posts are of an extruded vinyl material and can include metal reinforcing placed in the length of the railings.

SUMMARY OF THE INVENTION

A connector for a tubular rail according to the present invention includes a generally flat base with passageways therein through which a mechanical fastener can pass for securing of the connector. An exterior collar extends from one side of the base and is sized for receiving the end of a rail in close engagement with the collar. The collar cooperates with an insert positioned next to the collar to define a gap therebetween into which the open end of the tubular rail is inserted. With this arrangement the rail is trapped and snugly engaged by the collar and/or the insert.

According to an aspect of the invention the collar extends outwardly from said base at least one inch.

According to a further aspect of the invention the gap is of a depth of at least one inch and narrows from an open end of the collar towards the base.

According to an aspect of the invention the insert is an inside collar and the gap is defined between the inside collar and the exterior collar.

According to an aspect of the invention the base about each passageway includes bosses shaped for engaging and retaining against rotation the head of a bolt.

According to a further aspect of the invention the base on a side thereof opposite the exterior collar includes a small peripheral shoulder extending about the base for engaging a planar surface to which said collar is to be secured.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
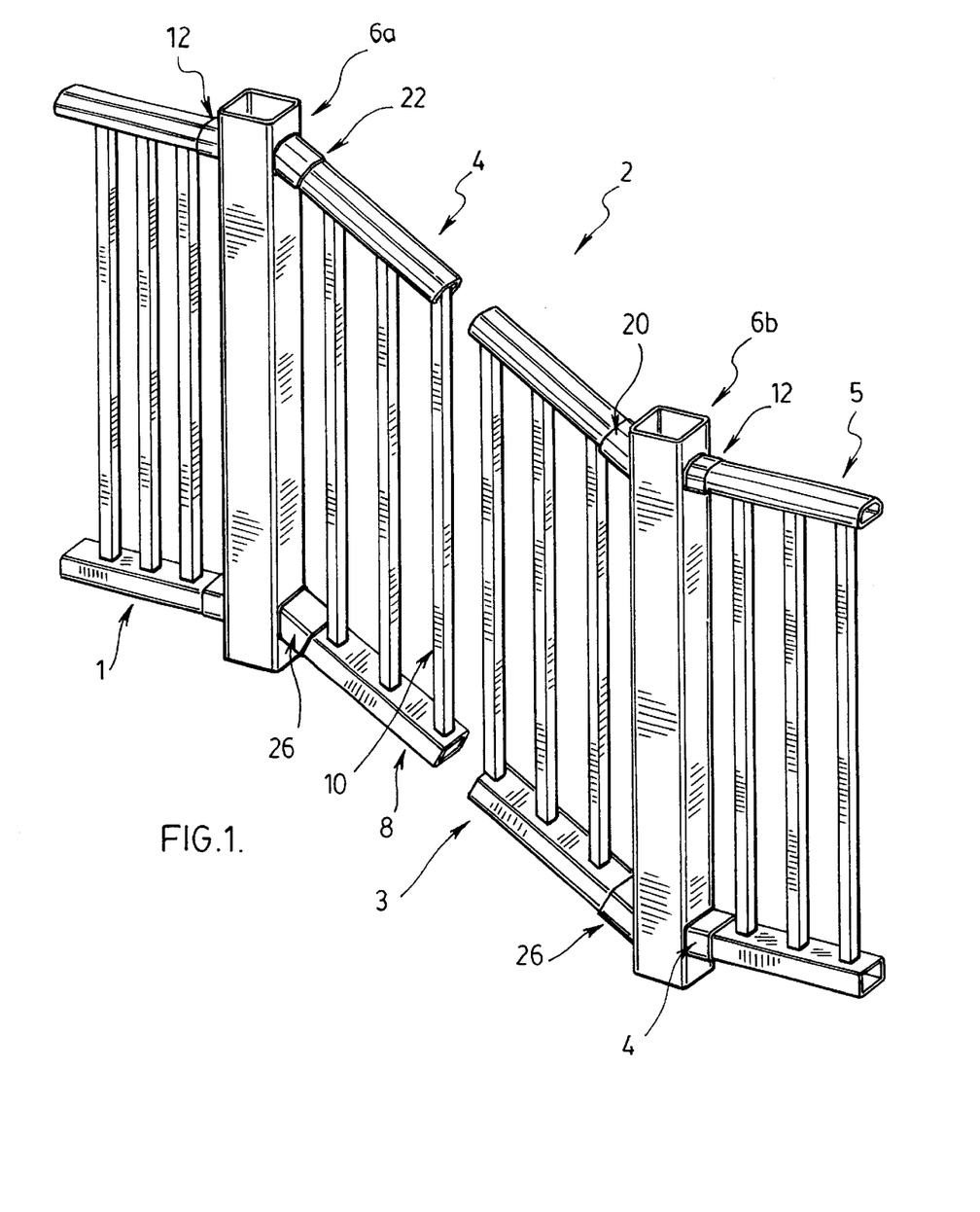
FIG. 1 is a partial perspective view of a railing system.

The railing system 2 as shown in FIG. 1 includes a horizontal section 1 connected to an angled section 3 and connected to a further horizontal section 5. Each of these sections include a handrail 4 connected to a vertical post 6a or 6b in combination with a bottom rail 8, extending between posts. A series of spindles 10 connect the bottom rail and the handrail.

Sections 1 and 5 have the handrail 4 connected to the vertical post by means of a horizontal handrail connector 12. The bottom rail 8 is connected to the post by means of a horizontal bottom rail connector 14. Where these rails connect to a further post, the same connector types can be used.

The angled section 3 requires two different connectors at opposite ends of the hand rail and a reversible connector 26 for the bottom rail. Handrail 4, has a downwardly opening angled connector 22 attached to the upper post 6a and an upwardly opening connector 20 attached to the bottom post 6b. The two connectors are required as the handrail 4 has distinct top and bottom surfaces. With respect to the bottom rail 8, its shape is symmetrical, and as such connectors 26 can be used at both the top and bottom locations by reversing the orientation of the connector. Therefore, the transition from the horizontal section 1 to the angled section 3 to the horizontal section 4 uses five different types of connectors secured to posts 6a and 6b. Fortunately, the eight connectors in total can be secured to whatever face of the post is necessary. These eight connectors replace 21 different posts that are required for factory based ported systems.

The eight connectors are used in different combinations. For example section 1 could be at 90° to the angle section 3. In addition, as will be more fully explained with respect to the drawings of the individual connectors, these connectors do allow for minor variations in angle and as such, can accommodate variations in the rise and run associated with a particular angled section 3.

Figure 2:
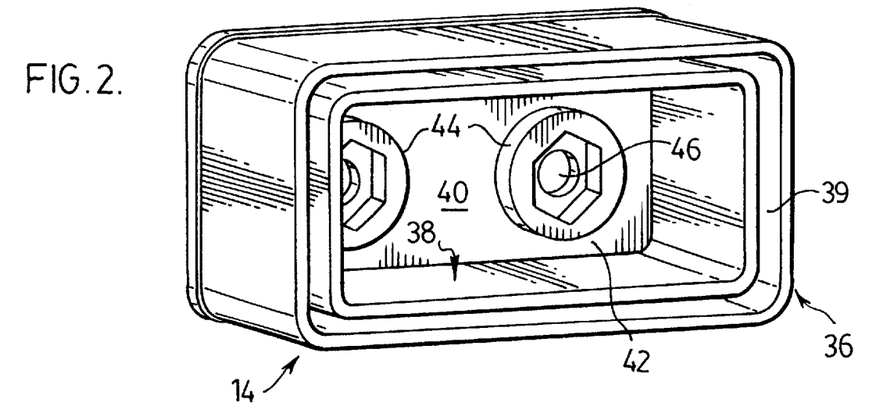
FIG. 2 is a front perspective view showing a horizontal connector for a rectangular rail.
Figure 3:
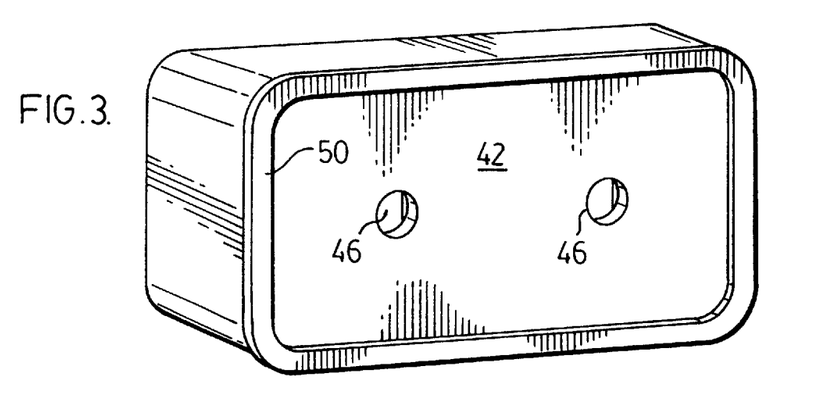
FIG. 3 is a rear perspective view of the connector of FIG. 2.

Details of the various connectors are shown in FIGS. 2 through 14. The connector 14 shown in FIGS. 2 and 3 are used for connecting the rectangular rail of a horizontal section. The connector 14 includes an outer collar 36 which defines a slot-like gap 39 between the outer collar 36 and an inner peripheral insert 38. This slot 39 is sized to receive the rail and depending upon tolerance variations will primarily engage the outer collar 36 in a snug fit, or snugly engage the inner peripheral insert 38. The slot 39 is slight tapered and as such is wider at the open end for easy insertion of a rail and narrows toward the bottom wall 42 for engaging the rail. The back of the connector 14 is shown in FIG. 3 and includes a peripheral shoulder 50 extending thereabout with the bottom wall 42 being slightly recessed relative to the back of the connector. The connector has two ports 46 passing through the bottom wall 42 for allowing a mechanical fastener to pass through a reinforced portion of the connector and engage the walls of a post.

The bottom wall 42 as shown in FIG. 2 includes two bosses 44 provided about the ports 46 and adapted to engage the hex heads of a bolt and hold the same against rotation. This reinforces the bottom wall 42 and simplifies installation of the connector to a post.

Figure 4:
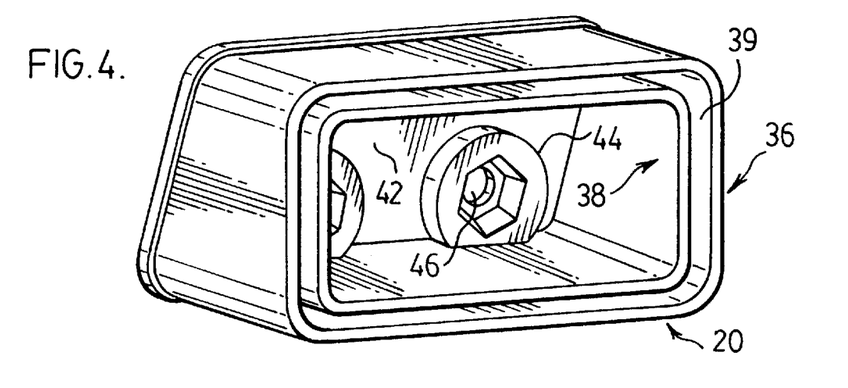
FIG. 4 is a front perspective view of a bottom connector which faces upwardly for connection with an angled rail.
Figure 5:
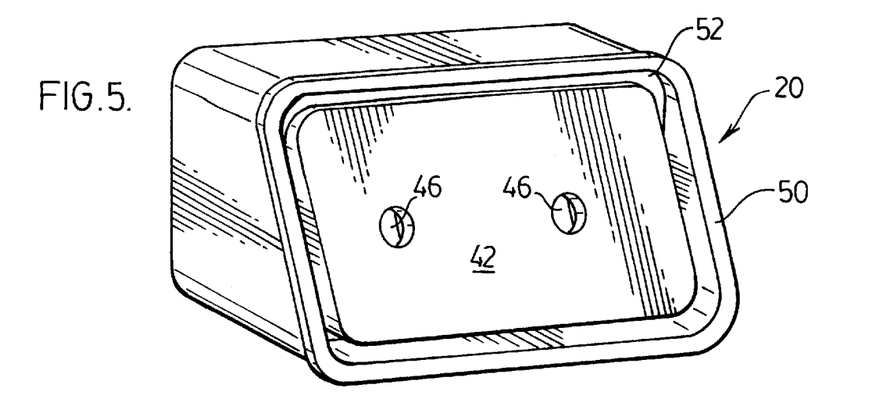
FIG. 5 is a rear view of the connector of FIG. 4.
Figure 5A:
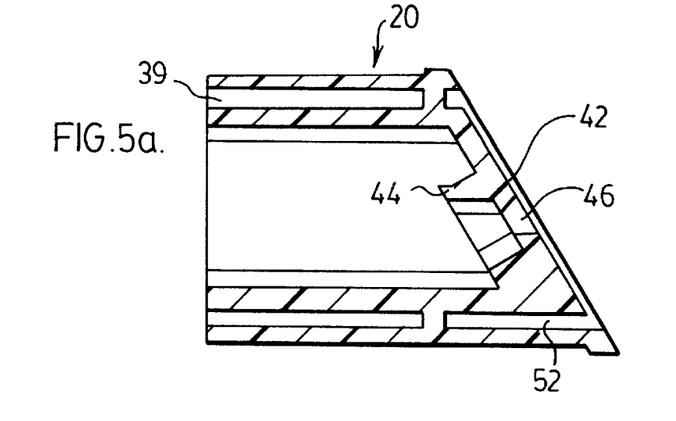
FIG. 5a is a sectional view of the connector of FIG. 5.

The angled connector 20 for a rectangular rail is shown in FIGS. 4 and 5. In this case, the depth of the connector has been increased to accommodate the angle. The bottom wall 42 is now disposed at the appropriate angle of about 30°. In the connector 20 of FIG. 5, the bottom wall 42 is at a similar relationship to the shoulder of the connector shown in FIG. 3. The slot-like gap 39 does not run to the approximate depth of the bottom wall 42 at all locations, and in fact stops short thereof as shown in the section of FIG. 5a. A varying depth slot 52 is provided on the back of the connector to reduce the amount of material and to also assist in the cooling of the part. The bottom wall 42 is provided with two ports 46 and bosses 44 are provided about the ports for engaging the head of a bolt. The ports in connector 20 are slightly elongated to accommodate the angle the connector makes with the post.

Figure 6:
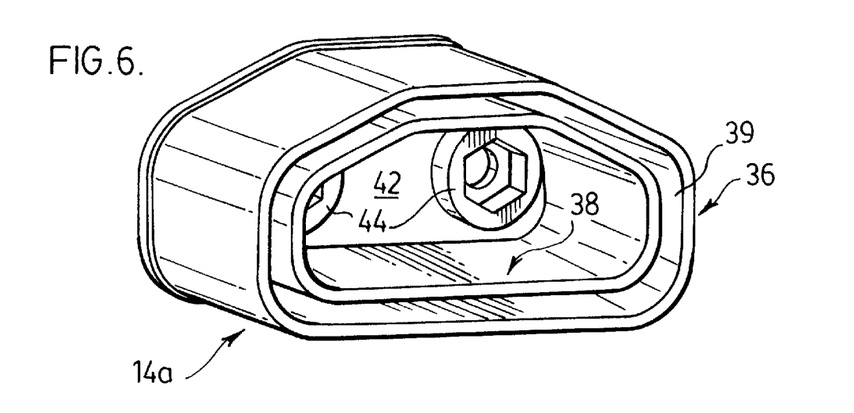
FIG. 6 is a front perspective view showing a connector for a shaped hand rail.
Figure 7:
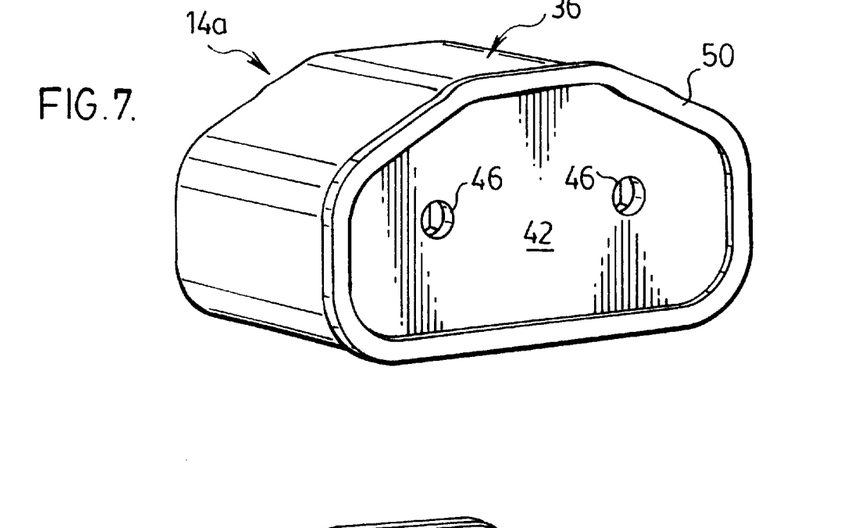
FIG. 7 is a rear view of the connector of FIG. 6.
Figure 8:
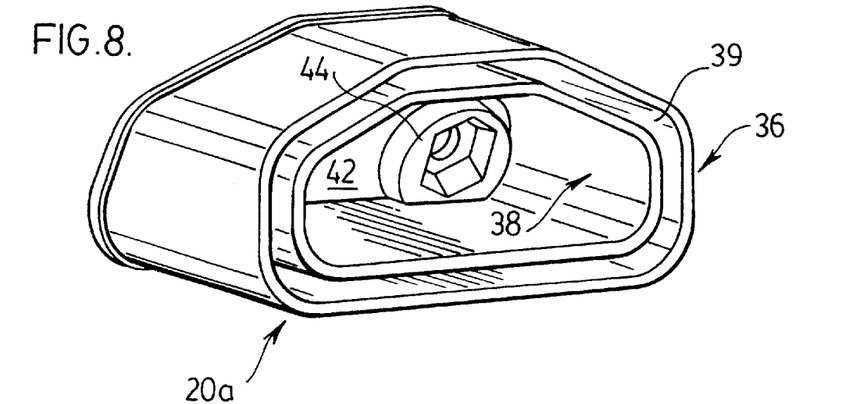
FIGS. 8 and 9 are front and rear perspective views of a connector similar to FIG. 6, however, the connector has been angled for receiving a lower end of a stair rail.
Figure 9:
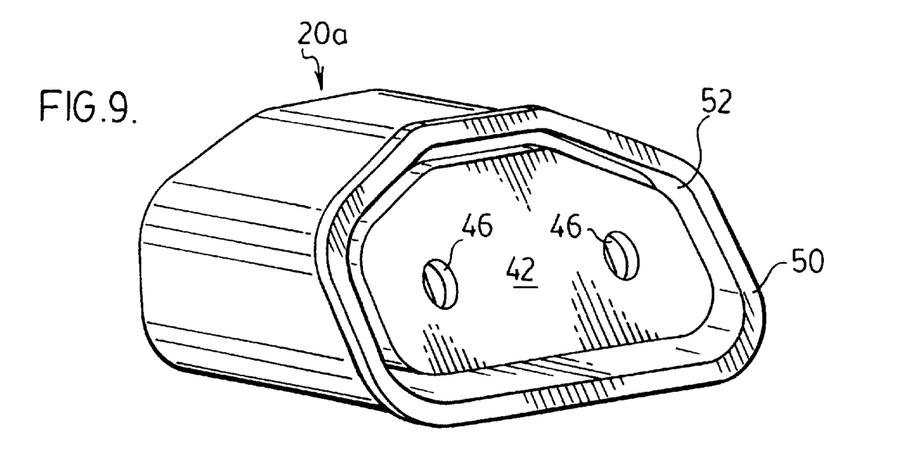
Figure 10:
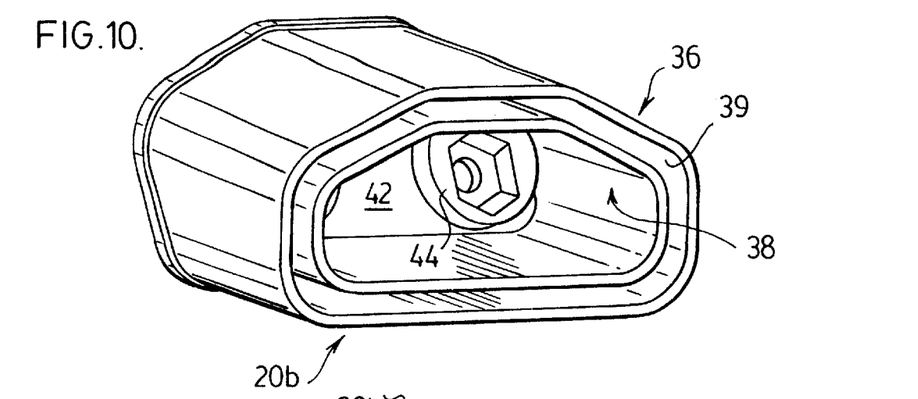
FIGS. 10 and 11 are front and rear perspective views of a connector similar to FIGS. 8 and 9, however, the connector is for receiving the upper end of a stair rail.
Figure 11:
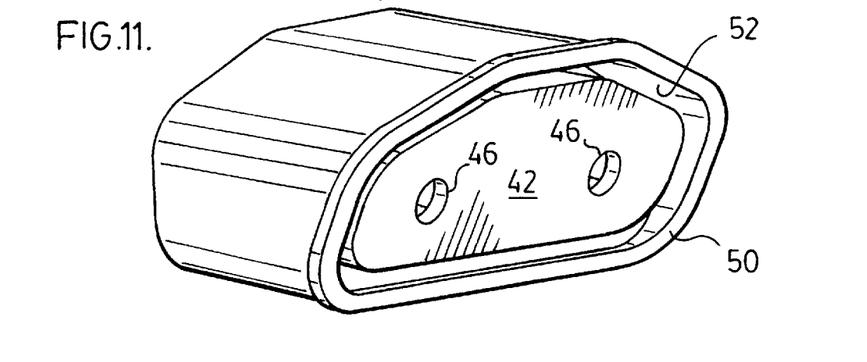

FIGS. 6 and 7 show a connector 14a similar to the connector of FIGS. 2 and 3, however, the connector is shaped for engaging the handrail 4. The connector 20a of FIGS. 8 and 9 is the handrail upwardly facing connector for the angled section and the connector 20b of FIGS. 10 and 11 is the handrail top connector (downwardly facing) for the angled section. The connectors of FIGS. 8 and 10 are different, in that the handrail is not symmetrical, and therefore, the same connector cannot be used at either end of the angled section and have the normal top surface of the handrail up. In some cases the handrail is reversed in orientation and used as a bottom rail.

One advantage of the various connectors shown in the Figures is that the connector provides an overlap with the rails of up to about a one inch. A one inch overlap has proven sufficient and keeps the connectors relatively small. Additional overlap, for example, of up to two inches can be used but the connectors become larger and the visual appearance of the product may be reduced. The rails, when inserted in the connectors, either provide a snug fit with the outer collar, or the inner insert type plug or both at least near the base of the slot. This provides a wide tolerance range while still providing a snug fit and increased strength due to inner and outer support. The rails are extruded and the tolerance variation changes occur as a function of the age of the extrusion die. Basically, the extrusion die slowly erodes leading to changes in the dimensions of the final part. When the effect of the erosion becomes large enough, the extrusion die is replaced. This arrangement allows for a larger tolerance variation. The actual connectors are injection molded, and as such, closer tolerances can be achieved. Also, with any plastic material, some shrinkage and/or warpage can occur from time to time. The connector is designed to engage either the outer or the inner part of the rail to form a snug connection and this arrangement simplifies the securing of the rail and the manufacture of the parts. The connectors, as shown in the drawings, all use an outer collar and an inner collar or plug type engagement, with a significant gap therebetween, sized for receiving the appropriate rail. Obviously, the shape of the connectors will vary depending upon the desired exterior shape of the rail. Also, the inner collar can be replaced with a segmented collar or even angled struts which provide selective contact with certain areas of the rail. It is desirable to have the outer collar continuous, as it provides a finished surface about a cut end of the rail. In contrast, the inner collar merely has to provide a snug fit with the interior wall of the rail and is hidden. It is basically a plug type insert and therefore, there is additional freedom with respect to the shape thereof. The segmented collar has a number of advantages with respect to cooling of the tool, and removal of the projecting portion of the tool which defines the gap. Angles struts also have the advantage of simplifying the tool with respect to forming of the inner plug. It can be appreciated that the configuration of the inner plug or collar can vary greatly, as it does not provide a visual exposed surface in the final product and its function is to engage the inner part of the rail.

The connectors of FIGS. 2 through 11 have a variable width gap which is smallest at the base and increases in width towards the free end of the collar. This increasing in width gap accommodates minor variations in the length of the rails (variations of one quarter of an inch are acceptable) hides the rough cut of the ends of the rails, accommodates poor square cuts of the rails such that the assembled system has a neat appearance. The insert provides support on the inside of the rail and cooperates with the outer collar to distribute loads to the base of the connector. Furthermore, the mechanical fasteners are hidden from view.

The end user merely has to butt-cut the vinyl rail in preparation for insertion in a connector. The connector is appropriately located on the vertical post and the location of the ports 46 are marked on the post. The post can then be drilled to allow a bolt-type fastener to pass therethrough. This bolt-type fastener will be exposed in the interior of the post and access to the fastener for placing a nut thereon is easily accomplished, as the connector is close to one end of the post. A ratchet or a spanner wrench can be used to rotate the nut with the head of the bolt being held by the boss within the connector.

Figure 12:
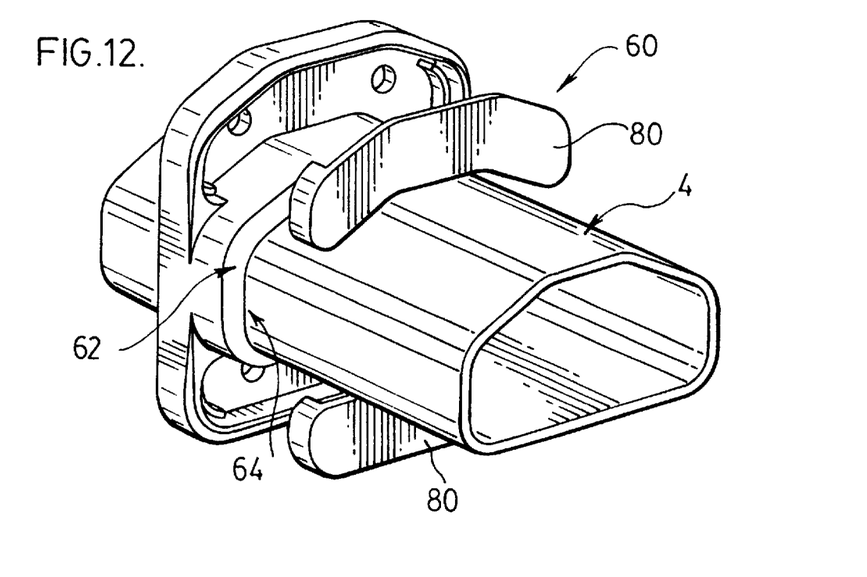
FIG. 12 is a perspective view of a connector which can be attached to a wooden post, or a vertical wall.
Figure 13:
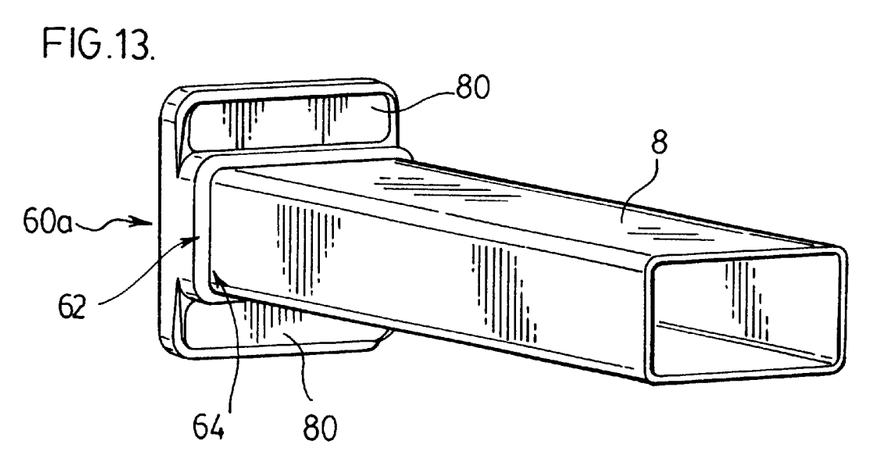
FIGS. 13 and 14 are perspective views of a connector similar to FIG. 12, but for use with a rectangular like rail.
Figure 14:
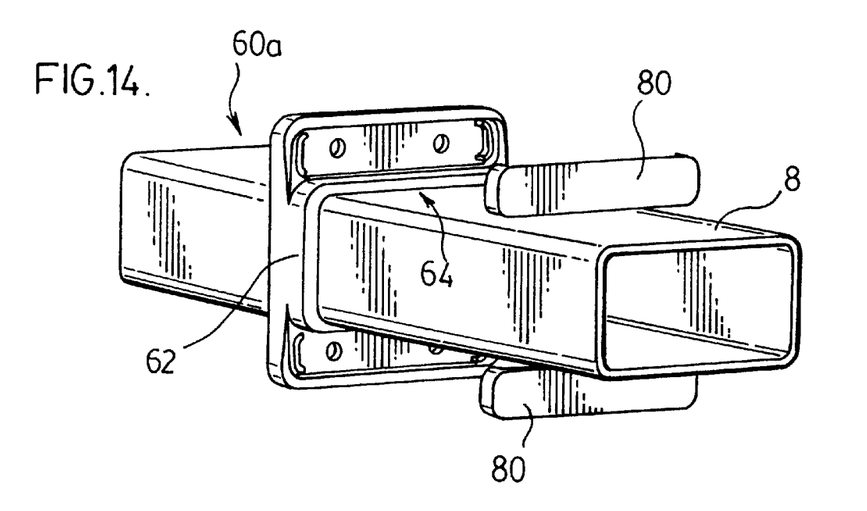

FIGS. 12, 13 and 14 show further connectors 60a and 60b, used for fastening of a rail member to a wall. In this case, the connector is of a much smaller depth and it has an outer collar 62 about a port 64 through which the rail 4 can extend. The connector is fastened to the wall using a conventional fastening arrangement, such as screws. Each connector has two snap-in cover pieces 80 which hide the fasteners. The rail generally terminates at the wall to which the connector is connected.

Figure 15:
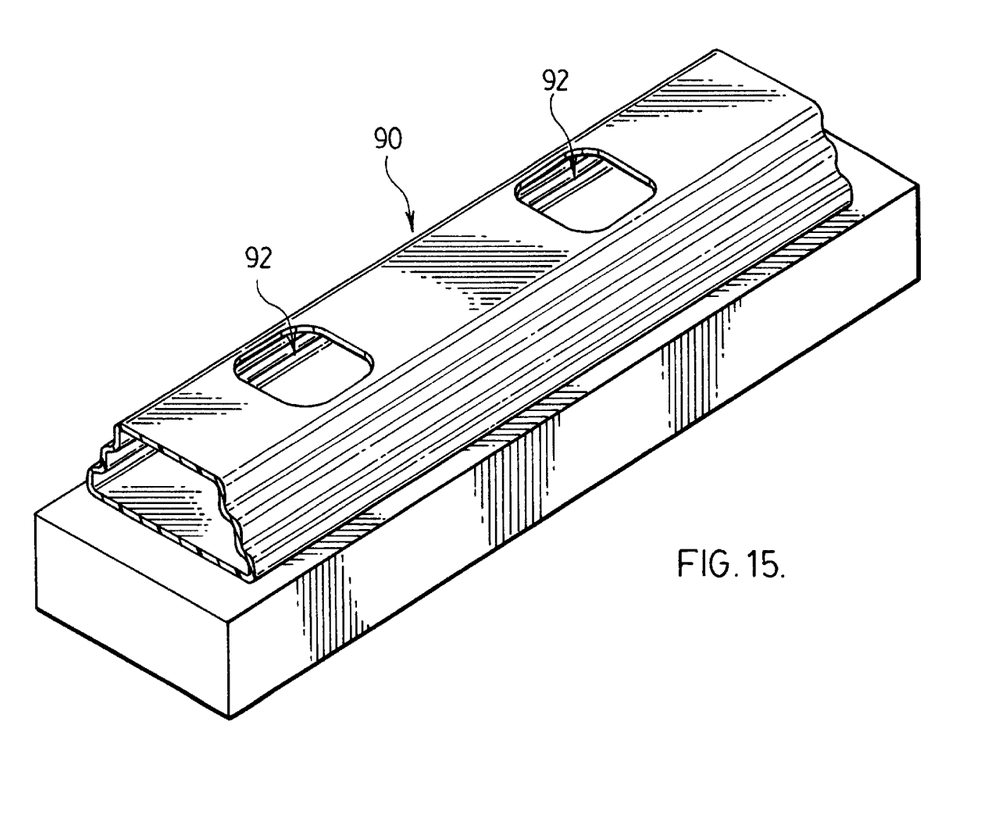
FIG. 15 illustrates an adapter commonly used with either a wooden bottom or a wooden top rail for convenient insertion of spindles and attachment of the spindles to the adapter.

FIG. 15 illustrates a wood to vinyl adapter 90. In some cases, it is desirable to use either a wood handrail, and/or a wood bottom rail with the top and bottom rails being connected by plastic or vinyl spindles. The plastic or vinyl spindles are essentially maintenance free. For some applications, it is desirable to use a wooden handrail, as many different styles and configurations are available and it may also be desirable to use wooden posts. The selection and style of these products in wood is extremely varied. The wood to vinyl adapter is also useful when attaching vinyl spindles to an existing wooden rail.

The converter 90 is mechanically attached to the bottom surface of the handrail, for example, and a separate converter is attached to the upper surface of the bottom rail. This adapter 90 includes spindle ports 92 in the top surface of the adapter through which the end of a spindle is inserted. Preferably, the spindle can include locking tabs which are basically punch-out type tabs in the end of the spindle from which a spring détente arrangement for locking with the adapter. These tabs are cammed inwardly during insertion of the spindle through the ports 92 and then snapped beneath the surface and lock with the top surface of the adapter.

The adapter is an extruded member and can have any desirable outside configuration. It is desirable to provide the adapter with a concave bottom surface such that the bottom edges of the adapter when attached to a bottom wooden member seat at the edges. The adapter 90 is mechanically fastened at a number of points along its length to the handrail or bottom rail, and this fastening is simplified as it can occur through the ports 92 prior to insertion of the spindles. The adapter shown in FIG. 15 can be used for converting from a wooden handrail to vinyl spindles which are supported at the lower edge by a vinyl bottom rail, or perhaps a wooden rail with a similar adapter provided on the upper surface thereof.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A connector for a tubular rail comprising a generally flat base with passageways therein through which a mechanical fastener can pass, an exterior collar extending from one side of said base and sized for receiving a rail end in close engagement with said exterior collar, said exterior collar cooperating with an interior collar positioned interior to said exterior collar and defining a gap therebetween into which the open end of the tubular rail is inserted whereby said rail is trapped between and snugly engaged by said exterior collar and said interior collar.

2. A connector as claimed in claim 1 wherein said exterior collar extends outwardly from said base at least one inch.

3. A connector as claimed in claim 2 wherein said gap is of a depth of at least one inch and narrows from an open end of said exterior collar towards said base.

4. A connector as claimed in claim 1 wherein said interior collar is connected to and extends outwardly from said one side of said base.

5. A connector as claimed in claim 4 wherein said interior collar projects defines a central portion of said base bound by said interior collar, and wherein said passageways extend through said central portion.

6. A connector as claimed in claim 5 wherein said base about each passageway includes bosses shaped for engaging and retaining against rotation the head of a bolt.

7. A connector as claimed in claim 5 wherein said base on a side thereof opposite said exterior collar includes a small peripheral shoulder extending thereabout for engaging a planar surface to which said collar is to be secured.

8. A connector as claimed in claim 4 wherein said exterior collar and said interior collar are disposed at an acute angle relative to said base.

9. A connector as claimed in claim 8 wherein said exterior collar and said interior collar are joined at the bottom of said gap and the bottom of the gap defines a plane which is disposed at an angle relative to the plane of said base.

10. A connector as claimed in claim 8 wherein said gap defined between exterior collar and said interior collar is variably spaced from said base.

11. A connector as claimed in claim 1 wherein said gap defined between said outer collar and said interior collar is of a variable width which is smallest at said base and increases in width towards a free end of said exterior collar, said variable width gap accommodating limited movement of said tubular rail necessary for minor variations in slope of the rail.

12. A connector as claimed in claim 1 in combination with a tubular rail inserted in said connector between said interior collar and said exterior collar, said interior collar snugly engaging said rail on an interior surface and transferring loads extended on said rail to said base.

13. A connector as claimed in claim 1 wherein said connector is injected molded.

14. A connector as claimed in claim 1 wherein said interior collar and said collar cooperate to support an inserted rail while accommodating variations in the depth to which a rail is inserted into said connector.

* * * * *